(12) United States Patent
Yang et al.

(10) Patent No.: US 8,138,721 B2
(45) Date of Patent: Mar. 20, 2012

(54) BATTERY PACK AND CHARGING METHOD FOR THE SAME

(75) Inventors: Jongwoon Yang, Suwon-si (KR); Segawa Susumu, Suwon-si (KR); Sesub Sim, Suwon-si (KR)

(73) Assignee: Samsung SDI Co., Ltd., Suwon-Si, Gyeonggi-do (KR)

( * ) Notice: Subject to any disclaimer, the term of this patent is extended or adjusted under 35 U.S.C. 154(b) by 402 days.

(21) Appl. No.: 12/467,977

(22) Filed: May 18, 2009

(65) Prior Publication Data
US 2009/0295332 A1 Dec. 3, 2009

(30) Foreign Application Priority Data
Jun. 3, 2008 (KR) .................. 10-2008-0052278

(51) Int. Cl.
*H02J 7/00* (2006.01)
(52) U.S. Cl. ............... 320/133; 320/130; 320/132
(58) Field of Classification Search .......... 320/132, 320/134, 135, 136, 137, 148, 152, 158, 159, 320/161, 162, 163, 164, 130, 133
See application file for complete search history.

(56) References Cited

U.S. PATENT DOCUMENTS

| | | | |
|---|---|---|---|
| 5,608,305 A * | 3/1997 | Kokuga .................. | 320/133 |
| 5,623,195 A * | 4/1997 | Bullock et al. .......... | 320/153 |
| 5,945,812 A | 8/1999 | Choi | |
| 6,747,439 B2 * | 6/2004 | Franke .................. | 320/133 |
| 7,248,023 B2 * | 7/2007 | Takezawa et al. ........ | 320/156 |
| 7,830,121 B2 * | 11/2010 | Sasaki ................... | 320/134 |
| 2003/0169017 A1 * | 9/2003 | Ariga et al. ............ | 320/125 |
| 2004/0257042 A1 * | 12/2004 | Liu et al. ............... | 320/130 |
| 2007/0075678 A1 * | 4/2007 | Ng et al. ............... | 320/106 |
| 2008/0007223 A1 | 1/2008 | Morioka | |
| 2009/0295335 A1 | 12/2009 | Yang et al. | |

FOREIGN PATENT DOCUMENTS

| | | |
|---|---|---|
| JP | 06-005310 | 1/1994 |
| JP | 06005310 A2 | 1/1994 |
| JP | 2000-253586 | 9/2000 |
| JP | 2000253586 A2 | 9/2000 |

(Continued)

OTHER PUBLICATIONS

Notice of Allowance dated Jan. 25, 2011 for corresponding Korean Patent Application No. 10-2008-0052278.

(Continued)

*Primary Examiner* — M'Baye Diao
(74) *Attorney, Agent, or Firm* — Knobbe, Martens, Olson & Bear, LLP

(57) ABSTRACT

A battery pack and a charging method for the same. The battery pack automatically regulates the full-charge voltage of a battery according to deterioration of lifespan of the battery. The battery pack includes: a rechargeable battery having a positive electrode and negative electrode; a switching module having a charge switching device and discharge switching device electrically connected to a high-current path of the battery; and a battery management unit electrically connected to the switching module to control the charge switching device and discharge switching device, electrically connected to the battery to measure an open-circuit voltage and a use time of the battery, determining whether the battery is deteriorated with reference to at least one of the open-circuit voltage and the use time of the battery, and setting a full-charge voltage of the battery when the deterioration of the battery is determined.

28 Claims, 2 Drawing Sheets

FOREIGN PATENT DOCUMENTS

| | | |
|---|---|---|
| JP | 2003-219573 | 7/2003 |
| JP | 2004-222427 | 8/2004 |
| JP | 2004-236381 | 8/2004 |
| JP | 2004222427 | 8/2004 |
| JP | 2007252086 A2 | 9/2007 |
| JP | 2007329000 A2 | 12/2007 |
| JP | 2008-005644 | 1/2008 |
| JP | 2008005644 A2 | 1/2008 |
| JP | 2008-067523 | 3/2008 |
| KR | 10 02419060000 | 11/1999 |
| KR | 10-330442 | 10/2003 |
| KR | 1020060086024 | 7/2006 |
| KR | 100653325 B1 | 11/2006 |
| KR | 2008-34321 | 4/2008 |

OTHER PUBLICATIONS

U.S. Appl. No. 12/708,151, filed Feb. 18, 2010, Youngjun Kim.

* cited by examiner

| Temp(°C) | 0 | 40 | 50 | 60 | 70 |
|---|---|---|---|---|---|
| Over discharge Voltage(V) | 4.3 | 4.3 | 4.2 | 4.1 | 4.1 |

BATTERY PACK AND CHARGING METHOD FOR THE SAME

CLAIM FOR PRIORITY

This application is based on and claims priority to Korean Patent Application No. 10-2008-0052278 filed on Jun. 3, 2008 in the Korean Intellectual Property Office (KIPO), the entire contents of which are hereby incorporated by reference.

BACKGROUND OF THE INVENTION

1. Field of the Invention

The present invention relates to a battery pack and a charging method for the same, and more particularly, to a battery pack and charging method for the same that regulate the full-charge voltage of a battery according to deterioration in lifespan of the battery.

2. Description of the Related Art

In a battery pack employing lithium-ion cells or lithium polymer cells, a safety circuit is electrically connected to a battery including an electrode assembly and electrolyte in a case. The battery is charged with and discharges electricity through chemical reactions, and the safety circuit prevents overcharge and overdischarge of the battery by regulating the charge-discharge process to protect the battery.

A full-charge mode is provided to the safety circuit to prevent overcharge. At the full-charge mode, when the charge voltage of the battery reaches a preset value, the safety circuit automatically terminates charging of the battery. Thus, the battery is prevented from overcharge and overheat and has a prolonged lifespan.

However, although the safety circuit prevents the overcharge, the battery inevitably suffers from with deterioration in lifespan such that capacity of the battery is lower than the initial capacity as time goes by.

Since a battery cell with deteriorated lifespan has a capacity lower than the initial capacity, the battery cell is overheated in a case of charging the battery cell up to a preset full-charge voltage preventing the overcharge. In a case of a battery cell repeatedly overheated, the deterioration of lifespan is accelerated when the battery cell is charged up to the initially set full-charge voltage so that the lifespan of the battery cell is shortened. Namely, the battery cell with deteriorated lifespan deteriorates stability of a battery pack.

In a portable electronic product such as laptop computer using a plurality of battery cells, the battery cells are charged at once. However, when any one of the battery cells has a deteriorated lifespan, there occurs cell imbalance. In other words, when there is a battery cell with deteriorated lifespan among the battery cells, since the deteriorated battery cell is charged with the initially set full-charge voltage, the lifespan deterioration is accelerated to shorten lifespan of overall battery cells.

When, in order to overcome the above-mentioned drawback, the full-charge voltage of a battery pack is set too low, since charging efficiency of the battery cells is inferior, power supply capacity of the battery pack is also inferior.

BRIEF SUMMARY OF THE INVENTION

The present invention has been made in view of the above problems, and the present invention provides a battery pack that regulates the full-charge voltage of battery cells according to deterioration of lifespan of the battery cells, and a charging method for the same.

The present invention also provides a battery pack that regulates the full-charge voltage of battery cells in a case of cell imbalance in which at least one of the battery cells has inferior lifespan and improved stability, and a charging method for the same.

In accordance with an embodiment of the present invention, there is provided a battery pack including: a rechargeable battery having a positive electrode and negative electrode; a switching module having a charge switching device and discharge switching device electrically connected to a high-current path of the battery; and a battery management unit electrically connected to the switching module to control the charge switching device and discharge switching device, electrically connected to the battery to measure an open-circuit voltage and a use time of the battery, determining whether the battery is deteriorated with reference to at least one of the open-circuit voltage and the use time of the battery, and setting a full-charge voltage of the battery when the deterioration of the battery is determined.

The battery management unit may set the full-charge voltage at a lower value with respect to a first deterioration when the open-circuit voltage of the battery falls below a threshold voltage and also at a lower value upon a second deterioration when the use time of the battery has elapsed for a specific time duration.

The battery management unit may further detect a charge ratio of the battery by accumulating the amount of current flowing through the battery, and set the full-charge voltage of the battery at a lower value upon a third deterioration when the charge ratio of the battery is maintained at a value equal to or higher than a threshold and the battery is left for a preset time duration.

The battery management unit may set the specific time duration to the use time of the battery from 10 months to 25 months at the second deterioration.

The battery management unit may lower the full-charge voltage of the battery by 40 mV to 60 mV at the deterioration of the battery.

The battery management unit lowers the full-charge voltage of the battery once every deterioration of the battery and stops the lowering of the full-charge voltage of the battery when the full-charge voltage of the battery falls to a full-charge voltage threshold. In this case, the full-charge voltage threshold is selected within a range of 3.95V to 4.05V.

The battery pack further comprises a temperature sensor electrically connected to the battery management unit, and the battery management unit may detect temperature of the battery from a signal input from the temperature sensor, and regulate the full-charge voltage of the battery to be lower as the temperature of the battery increases from a specific value of room temperature.

The battery management unit may turn off the charge switching device when the full-charge voltage of the battery is detected and stops the charging of the battery.

The battery pack may further comprise a current detecting device installed on the high current path between the positive electrode and the negative electrode of the battery, and the battery management unit may be electrically connected to the current detecting device to detect current of the battery.

The current detecting device may comprise a sense resistor, and the battery management unit may be electrically connected to both ends of the sense resistor and measure a voltage difference between the ends of the sense resistor when a reference voltage of the sense resistor is input to compute an amount of current flowing through the battery.

The battery management unit may comprise: an analog front end electrically connected to the battery to detect the open-circuit voltage of the battery, electrically connected to the charge switching device and the discharge switching device to turn on or off the charge switching device and the discharge switching device, and having a full-charge mode of turning off the charge switching device at a specific threshold voltage of the battery; and a microprocessor unit electrically connected to the analog front end to regulate a full-charge voltage at the full-charge mode of the analog front end.

In this case, the analog front end may comprise an application specific integrated circuit having an over-discharge mode, a full-discharge mode, a full-charge mode, and an overcharge mode according to the open-circuit voltage of the battery.

In accordance with another embodiment of the present invention, there is provided a charging method for a battery pack, including: detecting a deterioration condition by measuring an open-circuit voltage of a rechargeable battery and use time of the battery; setting a full-charge voltage by detecting the open-circuit voltage and the use time of the battery, determining whether the battery is deteriorated with reference to at least one of the open-circuit voltage and the use time of the battery, and setting a full-charge voltage of the battery when the deterioration of the battery is determined; and charging the battery up to the full-charge voltage and stopping the charging of the battery when a charge voltage of the battery is higher than the full-charge voltage.

In the setting a full-charge voltage, the full-charge voltage may be set low with respect to a first deterioration when the open-circuit voltage of the battery falls below a threshold voltage and set lower after a second deterioration when the use time of the battery has elapsed for a specific time duration.

In the setting a full-charge voltage, the specific time duration may be set to the use time of the battery from 10 months to 25 months at the second deterioration. In the setting a full-charge voltage, the full-charge voltage of the battery may be lowered by 40 mV to 60 mV at the deterioration of the battery.

In the charging the battery, a full-charge voltage threshold to which the open-circuit voltage of the battery falls may be selected within a range of 3.95V to 4.05V.

Temperature of the battery may be detected in the detecting a deterioration condition, and the full-charge voltage of the battery may be regulated to be lower as the temperature of the battery increases in the setting a full-charge voltage.

In the detecting a deterioration condition, a charge ratio of the battery may be detected by accumulating an amount of current flowing through the battery, and in the setting a full-charge voltage, the full-charge voltage of the battery may be set low upon a third deterioration when the charge ratio of the battery is maintained at a value equal to or higher than a threshold and the battery is left for a preset time duration.

According to the battery pack and the charging method for the same of the present invention, the charge efficiency and full-charge voltage of the battery are regulated according to the deteriorated lifespan of the battery, and thus stability thereof is improved.

According to the battery pack and the charging method for the same of the present invention, even though cell imbalance, when any one of a plurality of battery cells has a deteriorated lifespan, occurs in the battery pack, the full-charge voltage of the battery is regulated and thus the safety is improved.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figures 1, 2:
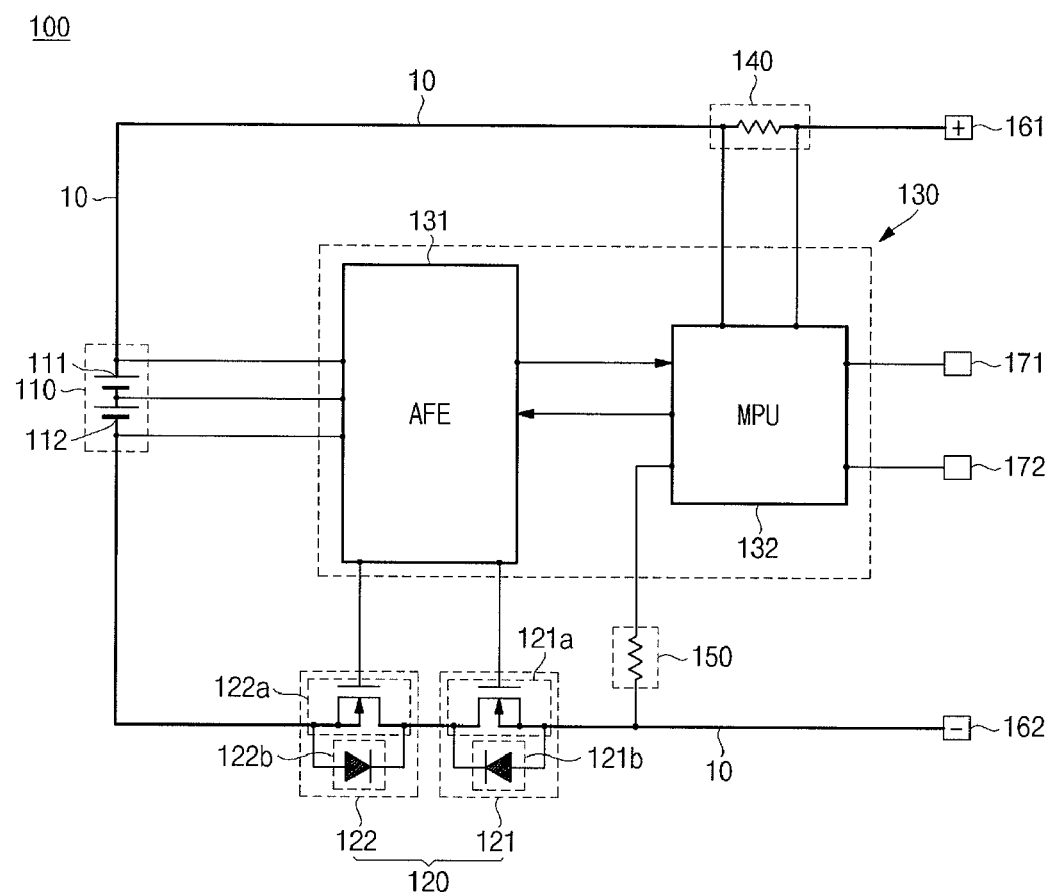
FIG. 1 is a block diagram illustrating a battery pack according to an embodiment of the present invention.
FIG. 2 shows an example of a look-up table embedded in a microprocessor unit of the battery pack illustrated in FIG. 1.

Hereinafter, embodiments of the present invention will be described in detail with reference to the accompanying drawings. The same reference numerals are used throughout the drawings to refer to the same or like elements. Detailed descriptions of well-known functions and structures incorporated herein may be omitted to avoid obscuring the subject matter of the present invention.

FIG. 1 is a block diagram illustrating a battery pack according to an embodiment of the present invention.

As illustrated in FIG. 1, a battery pack 100 according to an embodiment of the present invention includes a battery 110, a charge/discharge switching module 120, and a battery management unit (BMU) 130. The battery pack 100 according to the embodiment of the present invention further includes a current detection device 140. The battery pack 100 further includes a temperature sensor 150. The battery pack 100 further includes a positive terminal 161 and a negative terminal 162 that are electrically connected to a charger or an external load. In addition, the battery pack 100 further includes a first auxiliary terminal 171 and a second auxiliary terminal 172 to communicate with an external entity.

The battery 110 includes rechargeable cells respectively having a positive electrode 111 and negative electrode 112. In this embodiment, the battery 110 includes lithium-ion cells or lithium polymer cells in which an electrode assembly and electrolyte are enclosed in a case. The battery 110 may include either multiple cells in this embodiment or a single cell.

The charge/discharge switching module 120 includes a charge switching device 121 and a discharge switching device 122.

The charge switching device 121 includes a charging field-effect transistor (FET) 121a and a parasitic diode 121b associated with the charging FET 121a.

A drain and a source of the charging FET 121a are installed on a high-current path 10 of the battery 110. A gate of the charging FET 121a is electrically connected to an analog front end (AFE) 131, and is turned on or off in response to a control signal from the AFE 131. When a charger (not shown) is connected to the positive terminal 161 and the negative terminal 162, the charging FET 121a is turned on and conducts charging current from the charger to the battery 110.

The parasitic diode 121b is electrically connected in parallel to the charging FET 121a. The parasitic diode 121b is connected in the reverse direction with respect to the charge current. The parasitic diode 121b cuts off the path of charging current in case of full-charging of the battery 110. Accordingly, the parasitic diode 121b passes only the discharging current in case of full-charging of the battery 110 whereby the battery 110 is prevented from being overcharged, thereby improving the safety of the battery 110.

The discharge switching device 122 includes a discharging FET 122a and a parasitic diode 122b associated with the discharging FET 122a.

A drain and a source of the discharging FET 122a are installed on the high-current path 10 of the battery 110. A gate of the discharging FET 122*a* is electrically connected to the AFE 131, and is turned on or off in response to a control signal from the AFE 131. When the discharging FET 122*a* is turned on, it conducts discharging current of the battery 110 to an external load connected to the positive terminal 161 and negative terminal 162.

The parasitic diode 122*b* is electrically connected in parallel to the discharging FET 122*a*. The parasitic diode 122*b* is connected in the reverse direction with respect to the discharging current. The parasitic diode 122*b* cuts off the path of discharging current in case of full-discharging of the battery 110. Accordingly, the parasitic diode 122*b* passes only the charging current in case of full-discharging of the battery 110 whereby the battery 110 is prevented from being overdischarged, thereby improving the safety of the battery 110.

The BMU 130 includes an AFE 131 and microprocessor unit (MPU) 132.

The AFE 131 is electrically connected to the positive electrode 111 and the negative electrode 112 of each cell of the battery 110. The AFE 131 is electrically connected to the gate of the charging FET 121*a* and to the gate of the discharging FET 122*a*. The AFE 131 detects an open-circuit voltage, namely a voltage difference between the positive electrode 111 and negative electrode 112 of the battery 110, sets one of modes including overdischarge, full-discharge, full-charge and overcharge for the battery 110, and turns on or off the charge/discharge switching module 120 according to the set mode. Thereto, the AFE 131 includes a power control circuit to control the charge/discharge switching module 120.

In the modes of the AFE 131 including overdischarge, full-discharge, full-charge and overcharge, the overdischarge mode is set when the open-circuit voltage of the battery 110 falls below about 1.0V. In the overdischarge mode, the AFE 131 automatically switches off and stops discharging of the battery 110 so as not to consume power. Thereafter, in response to a charging signal from a charger (not shown) after the charger is connected between the positive terminal 161 and negative terminal 162, the AFE 131 transitions to the full-discharge mode. The full-discharge mode is set when the when the open-circuit voltage of the battery 110 falls to about 1.0V. In the full-discharge mode, the AFE 131 turns on the charge switching device 121, and turns off the discharge switching device 122 to cut off the current to an external load before overdischarging of the battery 110. The full-charge mode is set when the open-circuit voltage of the battery 110 is about 4.3V. In the full-charge mode, the AFE 131 turns off the charge switching device 121 so as not to overcharge the battery 110, preventing overheating of the battery 110. The overcharge mode is set when the open-circuit voltage of the battery 110 is higher than 4.3V. In the overcharge mode, the AFE 131 turns off the charge switching device 121 to stop charging of the battery 110.

The AFE 131 is an application specific integrated circuit (ASIC) acting as a power-driving circuit device to instantly detect the open-circuit voltage of the battery 110 and to drive the charge/discharge switching module 120. That is, the AFE 131 turns on and off the charge/discharge switching module 120 in a very short response time according to the mode to protect the battery 110 primarily.

The MPU 132 includes a microprocessor (not shown), and a passive element (not shown), an active element (not shown), and a memory element (not shown) that are electrically connected to the microprocessor. The MPU 132 is electrically connected to the AFE 131, and receives open-circuit voltage information of the battery 110 and obtains the voltage of the battery 110. The MPU 132 may change voltage levels set at the AFE 131 for the overdischarge mode, full-discharge mode, full-charge mode and overcharge mode. The MPU 132 may output a control signal to the AFE 131 to turn on or off the charge/discharge switching module 120. The MPU 132 measures the amount of current during the charging or the discharging of the battery 110. Thereto, the MPU 132 is electrically connected to the two ends of the current detecting device 140, and measures the change in voltage difference between the ends of the current detecting device 140 to calculate the amount of current. In addition, the MPU 132 measures the temperature of the battery 110. Thereto, the MPU 132 is electrically connected to the temperature sensor 150, and obtains the temperature of the battery 110 detected by the temperature sensor 150.

The MPU 132 determines the deteriorated state of the battery 110 using an internal algorithm. The battery 110 is deteriorated according to time and circumstance where the battery 110 is used and the deteriorated battery 110 has changed output voltage and charge amount. Therefore, the charge voltage of the deteriorated battery 110 must be regulated according to the deterioration of the battery 110. The charge voltage of the battery may be set by the charger or may be set different according to a type of the charger. Thus, the battery pack 100 is required to automatically regulate the charge voltage. To this end, the battery pack 100 according to this embodiment of the present invention determines the deterioration of the battery and decreases the full-charge voltage of the battery 110 to prevent overheating of the battery 110 so that safety of the battery pack 100 is improved. The MPU 132 of the battery pack 100 determining the above-mentioned deterioration determines first deterioration, second deterioration, and third deterioration, respectively.

The first deterioration is determined by which the MPU 132 receives the open-circuit voltage information of the battery and obtains the open-circuit voltage of the battery 110. The MPU 132 determines the first deterioration of the battery 110 by considering the open-circuit voltage of the battery as a parameter. In more detail, the first deterioration is a state where the open-circuit voltage of the battery 110 falls below a threshold voltage when the MPU 132 receives the open-circuit voltage information of the battery 110, and in this case the MPU 132 lowers the full-charge voltage set at the AFE 131. For example, when the open-circuit voltage of the battery 110 falls to a threshold voltage of 0.9V corresponding to the overdischarge, the MPU 132 determines the first deterioration of the battery 110. After the determination of the first deterioration, the MPU 132 lowers the set voltage by 50 mV in the full-charge mode. In other words, when an initial set voltage at the full-charge mode set at the AFE 131 is 4.3V, the MPU 132 lowers the set voltage by 50 mV at the full-charge voltage to set the set voltage to 4.25V.

The second deterioration is determined when the battery 110 is used for a certain use time. In order to determine the second deterioration, the MPU 132 calculates the use time of the battery 110. The MPU 132 may calculate the use time of the battery from time when the battery 110 is first used. The use time of the battery 110 may be calculated by measuring charge/discharge cycles of the battery 110 and storing the number of charge/discharge cycles in the MPU 132. After a lapse of the use time of the battery 110, the MPU 132 lowers the full-charge voltage set at the AFE 131. In other words, when a set voltage at the initial full-charge mode set at the AFE 131 is 4.3V, the MPU 132 lowers the set voltage by 50 mV at the full-charge voltage to set the set voltage to 4.25V.

The use time of the battery 110 for determination of the second deterioration may be set within a duration from 10 months to 25 months. In this case, the use time of the battery 110 is preferably equal to or longer than 10 months to prevent low charging efficiency due to too low full-charge voltage. The use time of the battery 110 is preferably set shorter than 25 months to prevent the safety from lowering due to the lowered full-charge voltage. In view of another technical point, the use time of the battery 110 is set within the above-mentioned duration according to circumstance and type of the battery 110 to regulate correlation between energy efficiency and safety of the battery 110.

The third deterioration is determined when the battery 110 is left for certain duration while maintaining charge ratio of the battery 110 at a threshold ratio. In order to determine the third deterioration, the MPU 132 calculates the charge ratio of the battery 110. The charge ratio of the battery 110 is a percentage of present charge ratio with respect to an initial capacity of the battery 110. The calculation of the charge ratio is carried out by the MPU 132 such that amount of current flowing through the high current path of the battery 110 is accumulated according to time when current flows and a ratio of the accumulated amount of current to be charged to the capacity of the battery 110. In other words, the charge ratio is calculated by expressing how much the accumulated amount of the charge current of the battery 110 occupies overall capacity of the battery 110 by a percentage. When the battery 110 is left for one year while the charge ratio of the battery 110 is maintained higher than 90% of the threshold ratio, the MPU 132 lowers the full-charge voltage of the AFE 131. When the set voltage set at the AFE 131 is 4.3V in the initial full-charge mode, the MPU 132 lowers the set voltage by 50 mV to set the set voltage to 4.25V.

In this embodiment, although the full-charge voltage of the battery 110 is lowered 50 mV by the MPU 132 at the first deterioration, the second deterioration, and the third deterioration, the full-charge voltage of the battery 110 may be regulated within a range from 40 mV to 60 mV at the above-mentioned deteriorations. Upon the determination of the deterioration, the full-charge voltage of the battery 110 is lowered from the full-charge voltage by more than 40 mV so that the battery 110 is more steadily charged, and is lowered from the full-charge voltage by less than 60 mV to maintain proper charge efficiency of the battery 110.

The MPU 132 sets a full-charge voltage threshold to lower the full-charge voltage of AFE 131. When the second deterioration is determined after the determination of the first deterioration and the lowering of the full-charge voltage of the battery 110, the MPU 132 further lowers the full-charge voltage by another 50 mV. When the first deterioration and the second deterioration are determined at the initial full-charge voltage 4.3V of the battery 110, the full-charge voltage of the battery 110 is lowered to 4.2V. When this lowering is repeated, the full-charge voltage of the battery 110 is too low and the charge is not performed effectively. Thus, the full-charge voltage threshold to which the full-charge voltage is lowered is determined from 3.95V to 4.05V. In this case, the full-charge voltage threshold is maintained at a voltage equal to or higher than 3.95V to increase the charge efficiency of the battery 110 and does not exceed 4.05V to improve the safety of the battery 110.

The temperature sensor 150 is electrically connected between the MPU 132 and the high-current path 10 of the battery 110. In this embodiment, the temperature sensor 150 includes a thermistor, and the MPU 132 detects the temperature of the battery 110 by measuring the change in resistance of the thermistor.

FIG. 2 illustrates a look-up table for temperature/full-charge voltage recording full-charge voltages matched with battery temperatures. The MPU 132 stores a temperature/full-charge voltage table relating full-charge voltages to battery temperatures as illustrated in FIG. 2. The MPU 132 obtains temperature information of the battery 110 by converting an electrical value read from the temperature sensor 150 into a battery temperature. Referring to the look-up table, when the temperature of the battery 110 is about 40 degrees Celsius (room temperature), the full-charge voltage is maintained at 4.3V without change. When the temperature of the battery 110 is about 50 degrees Celsius, the full-charge voltage is set to 4.2V with a decrement of about 0.1V. When the temperature of the battery 110 is between about 67 and 70 degrees Celsius, the full-charge voltage is set to 4.1V. Accordingly, the MPU 132 regulates the full-charge voltage of the battery 110 according to the battery temperature, prevents overheating of the battery 110, and thus improves the safety of the battery 110.

The current detecting device 140 is installed on the high-current path 10 of the battery 110. The two ends of the current detecting device 140 are electrically connected to the MPU 132. In this embodiment, the current detecting device 140 includes a sense resistor. The MPU 132 measures the voltage difference between two ends of the sense resistor, and calculates the change in voltage difference therebetween. The MPU 132 measures the voltage difference between the two ends of the sense resistor after storing a preset reference voltage of the sense resistor, and converts a change in voltage difference into a current value. Thereafter, the MPU 132 computes the charge ratio of the battery 110 by accumulating obtained current values. The MPU 132 can compute the amount of current during the charge or the discharge of the battery 110, and thus can turn off the charge/discharge switching module 120 to prevent deterioration and malfunction of the battery 110 due to overcurrent.

As described above, the battery pack 100 according to the embodiment of the present invention determines deterioration of the battery 110 and lowers the full-charge voltage of a battery 110 according to the deterioration of the battery 110, and thus further improves the safety of the battery pack 100. Even though cell imbalance, when any one of a plurality of battery cells has a deteriorated lifespan, occurs in the battery pack 100, the battery 110 is charged after the lowering of the full-charge voltage, and thus the safety is improved. Moreover, the battery pack 100 lowers the full-charge voltage of a battery 110 according to the temperature of the battery 110, and thus further improves the safety of the battery pack 100. The battery pack 100 detects overcurrent of the battery during the charging or the discharging of the battery 110, turns off the charge/discharge switching module 120, and thus improves safety of the battery pack 100.

Next, a charging method for the battery pack 100 is described.

Figure 3:
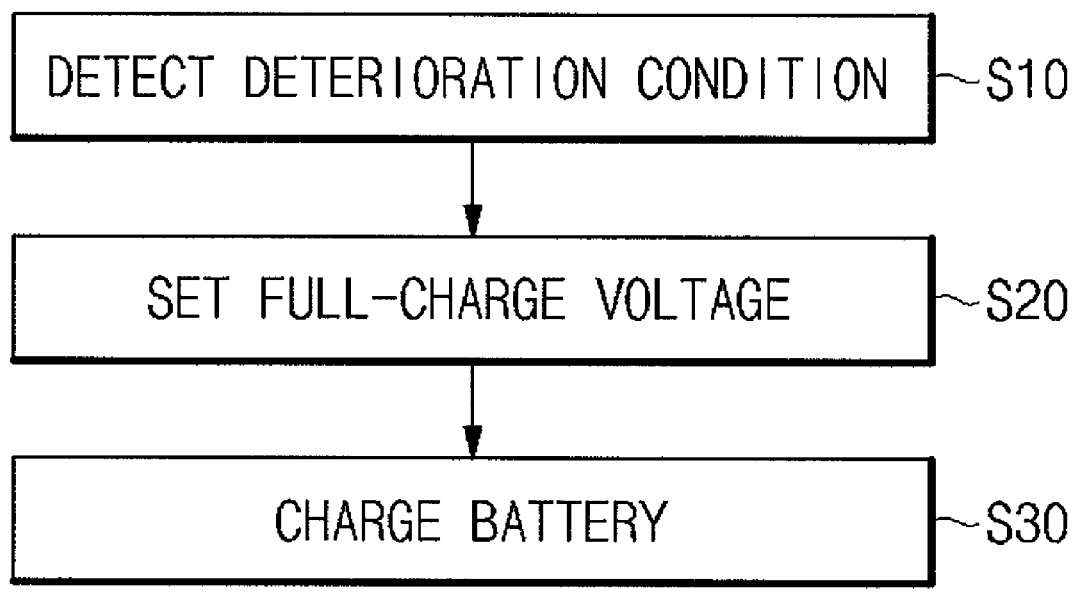
FIG. 3 is a flowchart illustrating a charging method for a battery pack according to another embodiment of the present invention.

FIG. 3 is a flowchart illustrating a charging method for a battery pack according to another embodiment of the present invention.

Referring to FIG. 3, the charging method for a battery pack includes steps of detecting a deterioration condition (S10), setting a full-charge voltage (S20), and charging a battery 110 (S30). In the following description, the battery pack 100 depicted in FIGS. 1 and 2 is referred to, but a repeated description of the battery pack 100 in relation to a configuration, function, process, and numeric range is omitted.

At step S10 of detecting a deterioration condition, the BMU 130 measures the open-circuit voltage and the use time of the rechargeable battery 110.

At step S20 of setting a full-charge voltage, the BMU 130 detects the open-circuit voltage and the use time of the battery 110 measured in the step (S10) of detecting the deterioration condition, determines whether the battery 110 is deteriorated, and sets the full-charge voltage of the battery 110 to a low voltage when the deterioration of the battery 110 is determined.

At the step of setting a full-charge voltage (S20), in order to determine the deterioration of the battery 110, the BMU 130 determines the first deterioration where the open-circuit voltage of the battery 110 falls below a threshold voltage and the second deterioration where a lapse of the use time of the battery 110 has occurred. At the step of setting a full-charge voltage (S20), the full-charge voltage to be set to the BMU 130 is lowered according to the first deterioration and the second deterioration. The full-charge voltage set at the BMU 130 is set by lowering the present full-charge voltage by 40 mV to 60 mV in each of the cases of the first deterioration and the second deterioration.

In addition, at step S20, in a case of the second deterioration, after a lapse of the use time of the battery 110 measured by the BMU 130 within the time duration from 10 months to 25 months, the full-charge voltage of the battery 110 is lowered.

The step S30 of charging a battery is carried out when a charger (not shown) is electrically connected to the positive electrode 161 and the negative electrode 162 of the battery pack 100. At step S30 of charging a battery, when the charger supplies the charge current to the battery 110, the BMU 130 turns on the charge switching device 121 and charges the battery 110 up to the full-charge voltage. At step S30, when the open-circuit voltage of the battery 110 becomes higher than the set full-charge voltage, the BMU 130 stops charging of the battery 110.

At step S30, when the open-circuit voltage of the battery 110 is a value determined within a range from 3.95V to 4.05V, the BMU 130 stops charging of the battery 110.

At step S10, the BMU 130 may detect temperature of the battery 110. In this case, at step S20, the full-charge voltage of the battery 110 is regulated to be lower as the temperature of the battery 110 becomes higher.

Moreover, at step S10, the amount of charge current of the battery is accumulated to compute the charge ratio of the battery 110. At step S20, when the third deterioration is determined while maintaining the charge ratio of the battery 110 at a threshold and leaving the battery 110 for preset time duration, the full-charge voltage of the battery 110 may be set to a lower voltage.

The charging method for the battery pack according to another embodiment of the present invention sets the deterioration of the battery pack 100 and lowers the full-charge voltage of the battery 110 to charge the battery 110 as the end time of charging the battery 110, and thus improves the stability of the battery pack 100. Even though cell imbalance, when any one of a plurality of battery cells has a deteriorated lifespan, occurs in the battery pack 100, the charging method prevents overheating of the battery 110 and improves stability of the battery pack 100. The charging method may set a proper full-charge voltage threshold of the battery 110 by considering charge efficiency of the battery pack 100, and regulates correlation between the stability and efficiency of the battery pack 100 according to circumstance and use of the battery 110.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A battery pack comprising:
    a rechargeable battery having a positive electrode and negative electrode;
    a switching module having a charge switching device and discharge switching device electrically connected to a high-current path of the battery; and
    a battery management unit electrically connected to the switching module to control the charge switching device and discharge switching device, electrically connected to the battery to measure an open-circuit voltage and a use time of the battery, determining whether the battery is deteriorated with reference to the open-circuit voltage and the use time of the battery, and setting a full-charge voltage of the battery when the deterioration of the battery is determined by reducing the full-charge voltage by a set first amount when the open circuit voltage declines below a threshold and by reducing the full-charge voltage by a set second amount when the use time of the battery exceeds a threshold.

2. The battery pack of claim 1, wherein the battery management unit sets the full-charge at a lower value with respect to a first deterioration when the open-circuit voltage of the battery falls below a threshold voltage and a second deterioration when the use time of the battery has elapsed for a specific time duration.

3. The battery pack of claim 2, wherein the battery management unit further detects a charge ratio of the battery by accumulating amount of current flowing through the battery, and sets the full-charge voltage of the battery low upon a third deterioration when the charge ratio of the battery is maintained at a value equal to or higher than a threshold and the battery is left for a preset time duration.

4. The battery pack of claim 2, wherein the battery management unit sets the specific time duration to the use time of the battery from 10 months to 25 months at the second deterioration.

5. The battery pack of claim 1, wherein the battery management unit lowers the full-charge voltage of the battery by 40 mV to 60 mV at the deterioration of the battery.

6. The battery pack of claim 1, wherein the battery management unit lowers the full-charge voltage of the battery once every deterioration of the battery and stops the lowering of the full-charge voltage of the battery when the full-charge voltage of the battery falls to a full-charge voltage threshold.

7. The battery pack of claim 6, wherein the full-charge voltage threshold is selected within a range of 3.95V to 4.05V.

8. The battery pack of claim 1, further comprising a temperature sensor electrically connected to the battery management unit,
    wherein the battery management unit detects temperature of the battery from a signal input from the temperature sensor, and regulates the full-charge voltage of the battery to be lower as the temperature of the battery increases from a specific value of room temperature.

9. The battery pack of claim 1, wherein the battery management unit turns off the charge switching device when the full-charge voltage of the battery is detected and stops the charging of the battery.

10. The battery pack of claim 1, further comprising a current detecting device installed on the high current path between the positive electrode and the negative electrode of the battery,
    wherein the battery management unit is electrically connected to the current detecting device to detect current of the battery.

11. The battery pack of claim 10, wherein the current detecting device comprises a sense resistor, and the battery management unit is electrically connected to both ends of the sense resistor and measures a voltage difference between the ends of the sense resistor when a reference voltage of the sense resistor is input to compute an amount of current flowing through the battery.

12. The battery pack of claim 1, wherein the battery management unit comprises:

an analog front end electrically connected to the battery to detect the open-circuit voltage of the battery, electrically connected to the charge switching device and the discharge switching device to turn on or off the charge switching device and the discharge switching device, and having a full-charge mode of turning off the charge switching device at a specific threshold voltage of the battery; and a microprocessor unit electrically connected to the analog front end to regulate a full-charge voltage at the full-charge mode of the analog front end.

13. The battery pack of claim 12, wherein the analog front end comprises an application specific integrated circuit having an overdischarge mode, a full-discharge mode, a full-charge mode, and an overcharge mode according to the open-circuit voltage of the battery.

14. A charging method for a battery pack, comprising:
detecting a deterioration condition by measuring an open-circuit voltage of a rechargeable battery and use time of the battery;

setting a full-charge voltage by detecting the open-circuit voltage and the use time of the battery measured in the measuring of the open-circuit voltage, determining whether the battery is deteriorated with reference to the open-circuit voltage and the use time of the battery, and setting a full-charge voltage of the battery when the deterioration of the battery is determined by reducing the full-charge voltage by a set first amount when the open circuit voltage declines below a threshold and by reducing the full-charge voltage by a set second amount when the use time of the battery exceeds a threshold; and charging the battery up to the full-charge voltage and stopping the charging of the battery when a charge voltage of the battery is higher than the full-charge voltage.

15. The charging method for a battery pack of claim 14, wherein, in the setting a full-charge voltage, the full-charge voltage is set low with respect to a first deterioration when the open-circuit voltage of the battery falls below a threshold voltage and a second deterioration when the use time of the battery has elapsed for a specific time duration.

16. The charging method for a battery pack of claim 15, wherein, in the setting a full-charge voltage, the specific time duration is set to the use time of the battery from 10 months to 25 months at the second deterioration.

17. The charging method for a battery pack of claim 14, wherein, in the setting a full-charge voltage, the full-charge voltage of the battery is lowered by 40 mV to 60 mV at the deterioration of the battery.

18. The charging method for a battery pack of claim 14, wherein, in the charging the battery, a full-charge voltage threshold to which the open-circuit voltage of the battery falls is selected within a range of 3.95V to 4.05V.

19. The charging method for a battery pack of claim 14, wherein temperature of the battery is detected in the detecting a deterioration condition, and the full-charge voltage of the battery is regulated to be lower as the temperature of the battery increases in the setting a full-charge voltage.

20. The charging method for a battery pack of claim 14, wherein, in the detecting a deterioration condition, a charge ratio of the battery is detected by accumulating an amount of current flowing through the battery, and in the setting a full-charge voltage, the full-charge voltage of the battery is set low upon a third deterioration when the charge ratio of the battery is maintained at a value equal to or higher than a threshold and the battery is left for a preset time duration.

21. A battery assembly comprising:
at least one rechargeable battery having a positive electrode and a negative electrode wherein the positive electrode and the negative electrode define a high current path that is adapted to be electrically coupled to a charging circuit and to a load;

a battery management unit that controls the level of charge of the at least one rechargeable battery and charges the at least one rechargeable battery to a full-charge value wherein the battery management unit monitors the open-circuit voltage and the use time of the battery and adjusts the full-charge value based upon the monitored open-circuit voltage and the use time of the battery by reducing the full-charge voltage by a set first amount when the open circuit voltage declines below a threshold and by reducing the full-charge voltage by a set second amount when the use time of the battery exceeds a threshold.

22. The assembly of claim 21, wherein the at least one rechargeable battery comprises a plurality of lithium based rechargeable batteries.

23. The assembly of claim 21, further comprising a current sensor that provides an indication of the current flow along the high current path to the battery management unit.

24. The assembly of claim 23, wherein the battery management unit further determines a charge ratio of the battery by determining the amount of current flowing through the battery over time and adjusts the full-charge value based upon the determined charge ratio.

25. The assembly of claim 21, wherein the battery management unit lowers the full-charge voltage of the battery by 40 mV to 60 mV upon detection of an open circuit voltage that is less than a preselected voltage threshold or that the use of the battery exceeds a pre-selected time threshold.

26. The assembly of claim 25, wherein the preselected voltage threshold comprises a voltage within the range of 3.95V to 4.05V and wherein the pre-selected time threshold comprises a time period within the range of 10 months to 25 months.

27. The assembly of claim 21, further comprising a switching module having a charge switching device and a discharge switching device that is electrically connected to a high-current path of the battery and is controlled by the battery management unit.

28. The assembly of claim 27, wherein the battery management unit turns off the charge switching device when the full-charge voltage of the battery is detected and stops the charging of the battery.

* * * * *